United States Patent
Choi

(10) Patent No.: US 7,233,805 B2
(45) Date of Patent: Jun. 19, 2007

(54) METHOD FOR MANAGING EXTENDED NEIGHBOR CELLS OF MOBILE TERMINAL

(75) Inventor: Kwang-Hae Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 598 days.

(21) Appl. No.: 10/822,375

(22) Filed: Apr. 12, 2004

(65) Prior Publication Data

US 2004/0224716 A1    Nov. 11, 2004

(30) Foreign Application Priority Data

May 10, 2003    (KR) ...................... 10-2003-0029649

(51) Int. Cl.
H04B 7/00    (2006.01)

(52) U.S. Cl. ..................... 455/522; 455/13.4; 455/574; 455/405

(58) Field of Classification Search ................ 455/522, 455/69, 509, 13.4, 464, 405, 502, 504, 515, 455/67.13, 574, 437, 438, 439

See application file for complete search history.

(56) References Cited

U.S. PATENT DOCUMENTS

| | | | | |
|---|---|---|---|---|
| 5,734,639 A | * | 3/1998 | Bustamante et al. | 370/208 |
| 5,987,332 A | * | 11/1999 | Gettleman et al. | 455/518 |
| 6,181,946 B1 | * | 1/2001 | Gettleman et al. | 455/509 |
| 7,092,716 B2 | * | 8/2006 | Nizri et al. | 455/448 |
| 2003/0190916 A1 | * | 10/2003 | Celedon et al. | 455/437 |

* cited by examiner

*Primary Examiner*—Matthew Anderson
*Assistant Examiner*—Tan Trinh
(74) *Attorney, Agent, or Firm*—The Farrell Law Firm

(57) ABSTRACT

Disclosed is a method for managing extended neighbor cells of a mobile terminal designed to save power of a battery as well as search time at a visited location. The method is characterized by the steps of collecting information on cells which belong to neighboring different PLMN (Public Land Mobile Network) other than the PLMN to which a serving cell, which the mobile terminal is assigned to belongs, and of performing rescanning of HPLMN using the information on cells.

2 Claims, 2 Drawing Sheets

METHOD FOR MANAGING EXTENDED NEIGHBOR CELLS OF MOBILE TERMINAL

PRIORITY

This application claims priority to an application entitled "Method for Managing Extended Neighbor Cells of Mobile Terminal" filed in the Korean Industrial Property Office on May 10, 2003 and assigned Serial No. 2003-29649, the contents of which are incorporated herein by reference.

BACKGROUND OF THE INVENTION

1. Field of the Invention

The present invention relates to a method for reducing power consumption of a battery of a mobile terminal, and more particularly to a method for managing extended neighbor cells of a mobile terminal designed to save power of a battery as well as search time at a visited location.

2. Description of the Related Art

According to the GSM (Global System for Mobile communication) specification, each mobile terminal performs cell management using information on BCCH (broadcast control channel) allocation lists (hereinafter, called "BA lists"), which are included in system information 2 (2bis and 2ter) received in an idle mode by the mobile terminal and system information 5 (5bis and 5ter) received in a dedicated mode by the mobile terminal, both of which belong to various system information relayed through BCCHs in an RPLMN (registered public land mobile network) to which a serving cell belongs. The serving cell is that cell to which the mobile terminal is currently assigned. Each BCCH, as a channel for transmitting various system parameters, transmits various information on a frequency, such as an operator, an identifier, cell location, or cell location variation.

The system information 2 is a neighbor cell description which is used in an idle mode of the mobile terminal. The neighbor cell description represents BCCH frequencies used in the cells neighboring a serving cell that the mobile terminal is assigned to. For this reason, the neighbor cell description is called the BA list.

The conventional cell management is divided into information collection for performing cell reselection in the idle mode of the mobile terminal, and neighbor cell management for performing hand-over in the dedicated mode of the mobile terminal. This neighbor cell management becomes still more important, as a general packet radio service (hereinafter, referred to as "GPRS") is introduced. Thus, reselection by the network has been introduced, as well as automatic cell reselection by the mobile terminal.

According to the GSM specification, variation from the present GSM to a third generation GSM (3GSM) allows less complicated conditions that the mobile terminal can determine a home PLMN (HPLMN) when within a visited PLMN (VPLMN).

The time for rescanning the HPLMN may be previously stored at a subscriber interface module (SIM) or newly provided by an over-the-air technique, in which the time has an interval of 6 minutes and a basic value of 30 minutes, which is also gradually reduced to the minimum value of 6 minutes. There are increasing service providers, who make use of 6 minutes as the basic value.

To rescan the HPLMN, a mobile terminal must measure the electronic power of the frequencies received from its vicinities and find the frequency satisfying the conditions required by the GSM 03.22 specification. In this case, to search and find frequencies for either the HPLMN or SIM preferred PLMN with respect to new frequencies of a varying field requires great amounts of battery power, as well as considerable amounts of time.

Considering that different common carriers do not share a frequency band with each other within the same area, there is a problem in that attempts for frequent measurement of electric power and for the resulting synchronization of many frequencies brings about unnecessary consumption of battery power. For instance, at their worst, there is a possibility to be in the face of a circumstance in which electric power of peripheral frequencies must be measured at an interval of 6 minutes.

SUMMARY OF THE INVENTION

Accordingly, the present invention solves the above-mentioned problems occurring in the prior art, and an object of the present invention is to provide a method for managing extended neighbor cells of a mobile terminal, which is designed to save battery power and decrease search time at a visited location.

In order to accomplish these objects, there is provided a method for managing extended neighbor cells of a mobile terminal, comprising the steps of: a) performing initial power measurement when the mobile terminal is turned on; b) detecting and storing information on carrier lists of BCCH (Broadcast Control Channel) of a different PLMN (Public Land Mobile Network) from first power lists obtained through the initial power measurement, and entering an idle mode; c) determining, after starting HPLMN (Home Public Land Mobile Network) rescan timer in the idle mode, if the HPLMN rescan timer is terminated; d) restarting the HPLMN rescan timer to perform first power measurement when it is determined that the HPLMN rescan timer is terminated; e) detecting and synchronizing frequencies excluding information on present holding carrier lists of BCCH of the different PLMN from second power lists obtained through the first power measurement performed after the HPLMN rescan timer is restarted; f) determining if swappable PLMNs are present, from signals of the synchronized frequencies; g) determining if the swappable PLMNs are HPLMNs after swapping PLMNs when the swappable PLMNs are present, and returning to the step d) when the swappable PLMNs are not present; and h) stopping the HPLMN rescan timer when the swappable PLMNs are the HPLMNs, and returning to the step d) when the swappable PLMNs are not the HPLMNs.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
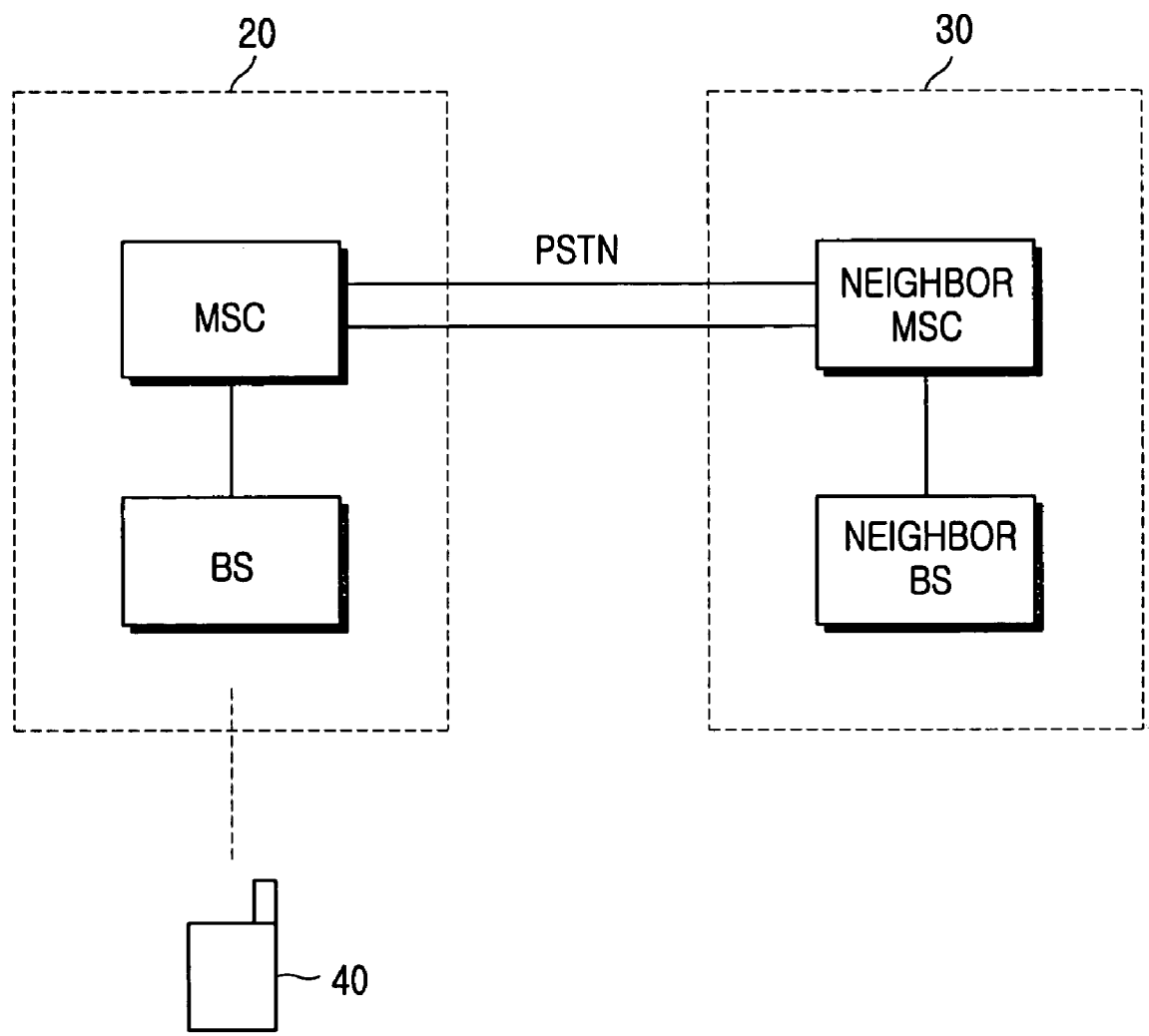
FIG. 1 shows a schematic construction of PLMN employed to the present invention.

Hereinafter, preferred embodiments of the present invention will be described in detail with reference to the accompanying drawings., It should be noted that similar parts are given reference numerals and symbols as similar as possible throughout the drawings. In the following description, numerous specific details are set forth, such as a specific time, etc., to provide a thorough understanding of the present invention. However, it will be obvious to those skilled in the art that the present invention may be practiced without such specific details. In the description of the present invention, a detailed description of known functions and configurations incorporated herein will be omitted when it may observe the subject matter of the present invention.

FIG. 1 shows a schematic construction of PLMN (Public Land Mobile Network) employed to the present invention.

Reference numeral 20 refers to an RPLMN (Registered Public Land Mobile Network) to which a serving cell belongs, and in which a mobile terminal 40 is located. Reference numeral 30 represents a second PLMN to which any neighbor cell belongs. Alternatively, reference numeral 30 may represent a VPLMN (Visited Public Land Mobile Network) to which any one of neighbor cells belongs, in which movement of a user causes the mobile terminal 40 to be located.

When the mobile terminal 40 is powered on, it accesses a PLMN. This access is dependant on a priority. For example, the access may be attempted to HPLMN, SIM adopted PLMN, −85 dBm or more field PLMN, and −85 dBm or less field PLMN in that order. Further, when the mobile terminal 40 is located at a different cell due to movement, the access is attempted according to the priority as mentioned above. More specifically, the HPLMN in an idle mode, the SIM adopted PLMN when it is difficult to access to the HPLMN, the −85 dBm or more field PLMN when it is difficult to access to the SIM adopted PLMN, and the −85 dBm or less field PLMN when it is difficult to access to the −85 dBm or more field PLMN.

Figure 2:
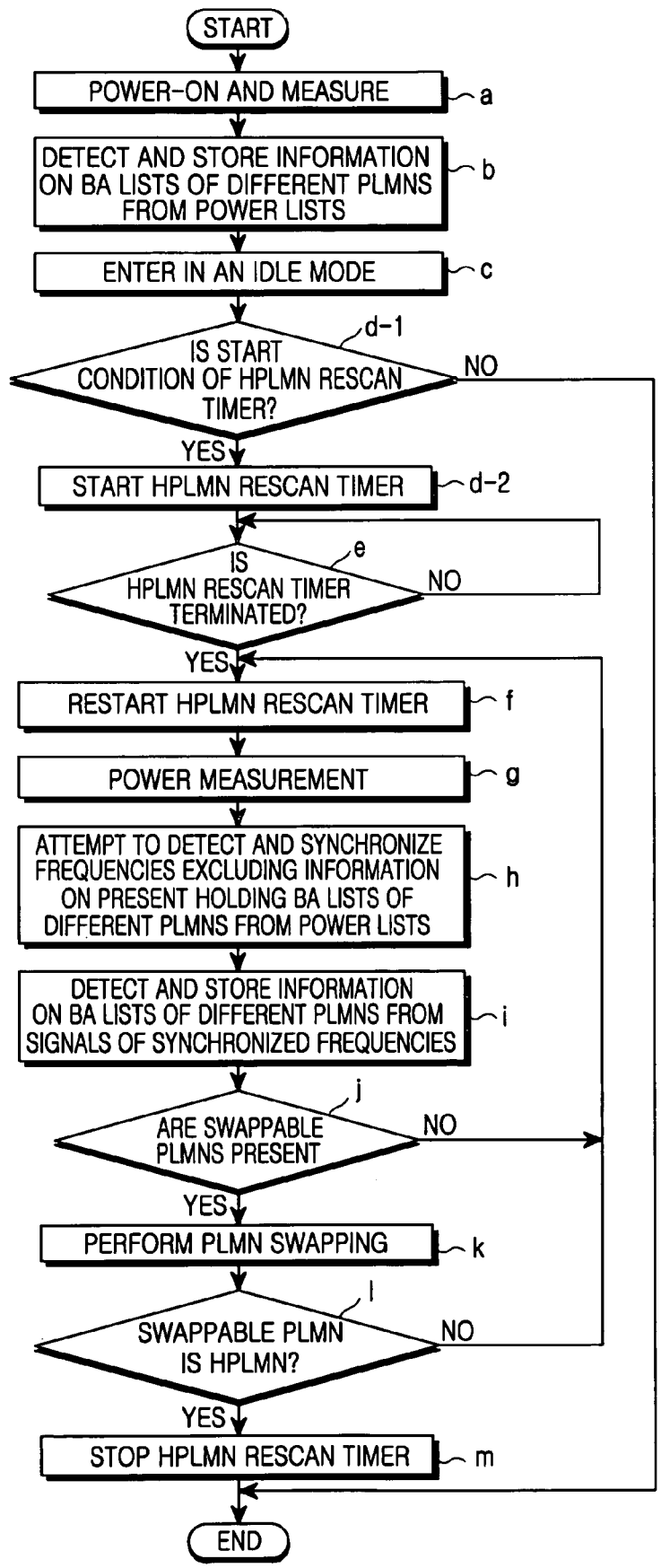
FIG. 2 is a flow chart showing a method for managing extended neighbor cells of a mobile terminal according to an embodiment of the present invention.

FIG. 2 is a flow chart showing a method for managing extended neighbor cells of a mobile terminal according to an embodiment of the present invention.

In this embodiment, it is assumed that when the mobile terminal 40 is changed from a power-off state into a power-on state, there is no HPLMN to which various cells belong, which the mobile terminal 40 is capable of sensing. Further it is assumed that a PLMN selection mode is automatic and national roaming (i.e. attempting a location update from an HPLMN to a different PLMN in the same area) is preformed.

In step a, when the mobile terminal 40 is powered on, the mobile terminal 40 carries out "initial power measurement" (distinguished from "power measurement" preformed in step g). In step b, the mobile terminal 40 detects and stores information on BA lists of various PLMNs from the power list obtained as a result of performing the initial power measurement. The mobile terminal also collects information on BA lists related to neighboring (at present, in a standby state) PLMNs other than the PLMN which the mobile terminal is assigned to.

In step c, the mobile terminal 40 enters in an idle mode. In this case, a PLMN to which the mobile terminal is assigned is determined together with the other PLMN(s) which the mobile terminal is not assigned to. In step d-1, the mobile terminal 40 checks start conditions of an HPLMN rescan timer defined by the GSM 03.22 specification. If the start conditions accord with the specification, the mobile terminal proceeds to step d-2 and starts the HPLMN rescan timer. However, if the start conditions do not accord with the specification, the work is terminated. Further, since the mobile terminal 40 scans the HPLMN of the cell to which the mobile terminal 40 itself belongs is defined by the GSM specification, a time interval can be arbitrarily set by common carriers.

Until it is determined that the HPLMN rescan timer starts in step d-2 and comes to an end in step e, a standby state is maintained until a next period starts without performing the HPLMN rescan as in steps g through m below, because it is directly after the initial power measurement has been performed in step a, in other words, it is confirmed that the HPLMN is not present.

In step e, the mobile terminal 40 determines if the HPLMN rescan timer comes to an end. If the HPLMN rescan timer is terminated, the HPLMN rescan timer starts again in step f. After the HPLMN rescan timer starts again, a power measurement is performed again in step g. In step h, the mobile terminal 40 detects frequencies excluding information on present holding BA lists of different PLMNs from the power lists obtained as a result of the power management. That is, the mobile terminal collects information on BA lists of neighboring PLMNs other than the PLMN to which the mobile terminal is assigned. In this case, if no frequency is detected, it means that no displacement of the mobile terminal 40 is generated.

The mobile terminal 40 attempts synchronization with respect to the detected frequencies. In step i, information on BA lists of different PLMNs is detected from signals of the synchronized frequencies, and the detected results are stored.

In step j, the mobile terminal 40 determines if swappable PLMNs are present. If the swappable PLMNs are present, PLMN swapping is performed in step k. In step l, it is determined if the swappable PLMNs are the HPLMNs. If the swappable PLMNs are the HPLMNs, the HPLMN rescan timer comes to an end in step m.

When it is determined either that the swappable PLMNs are not present in step j or that the swappable PLMNs are not the HPLMN in step l, the mobile terminal 40 returns to step f to restart the HPLMN rescan timer, and then proceeds toward step g to perform the power measurement again.

The HPLMN rescan timer starts only under the situation of national roaming in case of a 2G (Second Generation) system, but it starts even under the situation of international roaming in case of a 3G (Third Generation) system. As for the 3G, the swappable PLMNs are the HPLMNs and preferred PLMNs (hereinafter referred to as "PPLMN"). Here, the HPPLMs have a higher priority than the PPLMNs, and this priority is present between the PPLMNs.

When the swappable PLMNs are selected and the selected PLMNs are the HPLMNs, the HPLMN rescan timer is no longer required, so that the HPLMN rescan timer is stopped. However, when the selected PLMNs are the PPLMNs, the HPLMN rescan timer continues to be driven, so that attempt is made for conversion to a higher PPLMN or HPLMN.

According to the foregoing embodiment, the mobile terminal is adapted to store results of synchronization with respect to frequencies of cells (i.e. a cell to which the mobile terminal is assigned and its neighbor cells) which are subject to power measurement under various situations capable of occurring when the mobile terminal is powered on and in an idle mode. In other words, once the mobile terminal stores information on BA lists of PLMNs other than the RPLMN to which the mobile terminal is assigned, the information can be used when search operation is carried out in order to determine the swappable PLMNs. In this manner, when frequency information on the PLMN of visited location (i.e., shifted cell) has been already stored at the mobile terminal, the mobile terminal can perform swapping with the PLMN of the visited location directly without various operations, such as electric power measurement, HPLMN rescanning, synchronization and so on. When this swapping is determined, it is no longer necessary to perform such operations, for example, electric power measurement and synchronization.

As mentioned above, while being in an idle mode, the mobile terminal collects and stores information not only related to the PLMN to which the cell, which the mobile terminal is assigned to, belongs, but also on PLMNs to which its neighbor cells belong, so that the mobile terminal does not need to perform unnecessary operations such as electric power measurement, synchronization and so on when moving to any neighboring cell (i.e., a visited location), thus allowing for preventing power of the battery or time from being wasted in proportion to removal of the unnecessary operations. In addition, even when the HPLMN rescan timer comes to an end due to movement to the visited location, the mobile terminal can immediately check whether the swappable PLMNs are present using information on BA frequencies updated until the HPLMN rescan timer comes to an end, so that the time to perform the HPLMN rescanning can be shortened.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for managing extended neighbor cells of a mobile terminal, comprising the steps of:
   a) performing initial power measurement when the mobile terminal is turned on;
   b) detecting and storing information on carrier lists of BCCH (Broadcast Control Channel) of a different PLMN (Public Land Mobile Network) from first power lists obtained through the initial power measurement, and entering an idle mode;
   c) determining, after starting HPLMN (Home Public Land Mobile Network) rescan timer in the idle mode, if the HPLMN rescan timer is terminated;
   d) restarting the HPLMN rescan timer to perform first power measurement when it is determined that the HPLMN rescan timer is terminated;
   e) detecting and synchronizing frequencies excluding information on present holding carrier lists of BCCH of the different PLMN from second power lists obtained through the first power measurement performed after the HPLMN rescan timer is restarted;
   f) determining if swappable PLMNs are present, from signals of the synchronized frequencies;
   g) determining if the swappable PLMNs are HPLMNs after swapping PLMNs when the swappable PLMNs are present, and returning to step d) when the swappable PLMNs are not present; and
   h) stopping the HPLMN rescan timer when the swappable PLMNs are the HPLMNs, and returning to step d) when the swappable PLMNs are not the HPLMNs.

2. A method according to claim 1, wherein the step c) comprises the sub-steps of:
   c-1) determining if a present state satisfies start conditions of the HPLMN rescan timer;
   c-2) determining if the HPLMN rescan timer is terminated after the HPLMN rescan timer is started when the present state satisfies the start conditions, and terminating operation when the present state does not satisfy the start conditions.

* * * * *